United States Patent Office 2,954,008
Patented Sept. 27, 1960

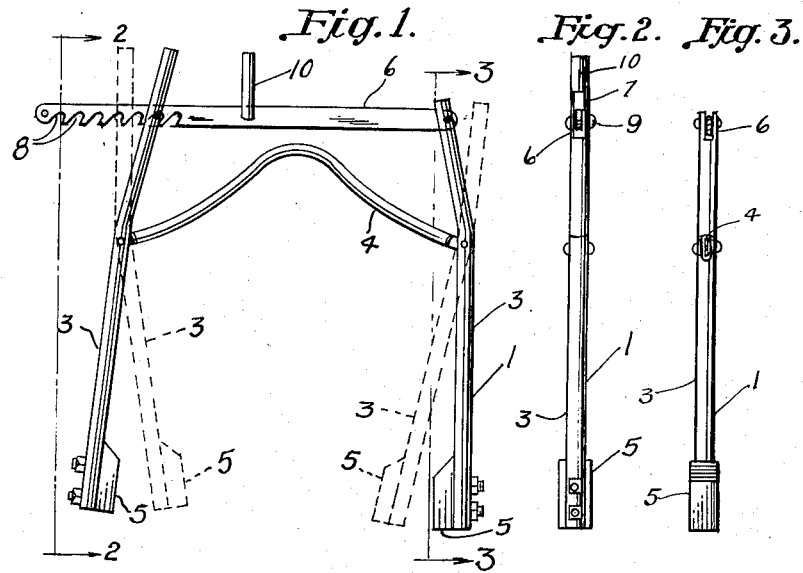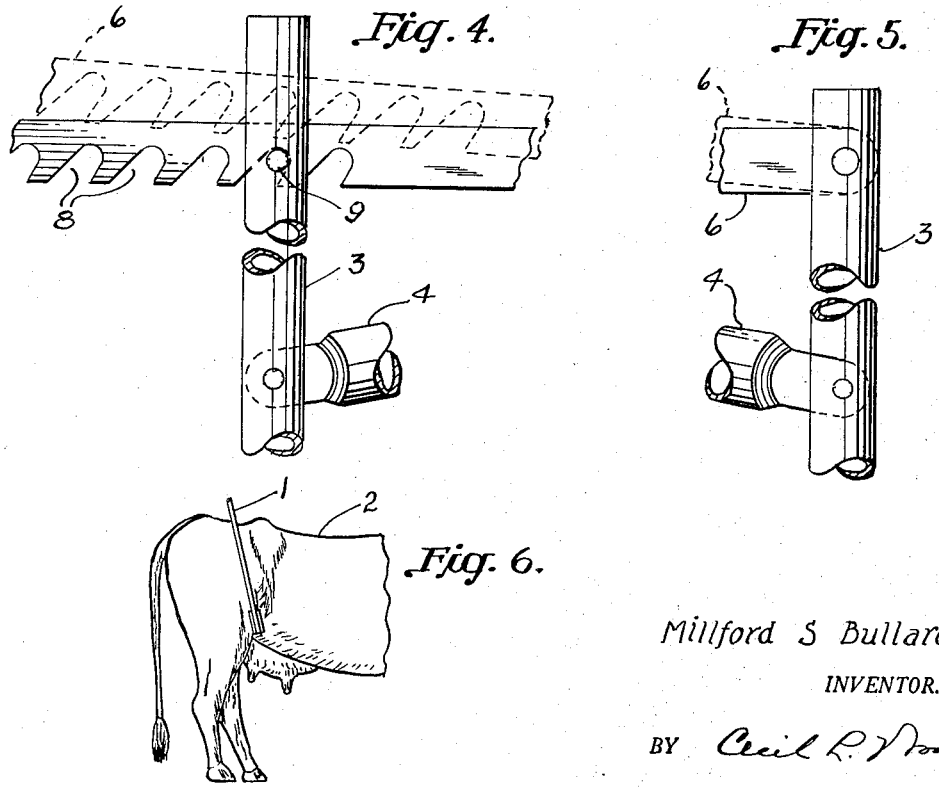
Millford S Bullard
INVENTOR.

2,954,008

ANTI-KICK DEVICE FOR COWS

Millford S. Bullard, Box 686, Crowley, Tex.

Filed Nov. 21, 1958, Ser. No. 775,478

1 Claim. (Cl. 119—126)

This invention relates to an anti-kick device for cows, and it concerns more particularly a clamp capable of being applied to the back and sides of a cow, in clamping engagement with the flesh and muscles comprising the flanks of the cow, and extending across the hollow above the hips, to prevent the cow from kicking.

In the milking of cows, the possibility of the cow kicking is an ever present threat. The proximity of the milking station to the cow's hind legs often results in the milk bucket being upset, as well as being hazardous to the safety of the milker. The principal object of the invention is to provide simple and effective means for restraining a cow from kicking, as during the milking operation.

Another object of the invention is to provide a light weight, portable device, capable of being supported entirely upon the body of a cow, for the purpose described.

Another object of the invention is to provide a device of the type described which is readily adjustable to fit any cow, and which is easily applied to a cow and removed therefrom.

A further object of the invention is to provide such a device which is of sturdy, rugged construction, may be manufactured inexpensively, is efficient in use and is relatively indestructible.

The invention will be readily understood by referring to the following description and the accompanying drawing, in which:

Fig. 1 is a front elevational view of a device embodying the invention;

Fig. 2 is a sectional elevational view taken on the lines 2—2 of Fig. 1;

Fig. 3 is a sectional elevational view taken on the lines 3—3 of Fig. 1;

Fig. 4 and Fig. 5 are fragmentary views, on an enlarged scale, illustrating the method of operation of the device; and Fig. 6 is a fragmentary side elevational view of a cow having the device applied thereto.

Referring to the drawing, the device of the invention consists of a clamp, designated generally by the numeral 1, which is capable of being applied to the back and sides of a cow, indicated by the numeral 2, in clamping engagement with the flesh and muscles comprising the flanks of the cow, and extending across the hollow above the hips, as shown in Fig. 6.

The clamp 1 includes a pair of elongated side members 3, which are normally disposed substantially vertically and are pivotally connected intermediate their ends to opposite ends of an elongated transverse member 4.

The side member 3 and the transverse member 4 advantageously may be of tubular construction throughout at least portions of their lengths. The side members 3 preferably are bent inwardly at an obtuse angle intermediate their ends, and have knobs 5 attached to the inner sides thereof, adjacent their lower ends, for engagement with the sides of the cow 2. The transverse member 4 is arched intermediate its ends for engagement with the back of the cow 2.

An elongated flat bar 6 is pivotally connected at one end to the upper end of one of the side members 3, and its opposite end is passed through an opening provided therefor in the upper end of the other side member 3, which may be either slotted, as at 7, or bifurcated. A plurality of longitudinally spaced notches 8 are formed in the under side of the free end of the bar 6 for selective engagement by a pin 9, which extends transversely through the slotted end 7 of the adjacent side member 3, whereby the bar 6 is adjustably connected to the adjacent side member 3 and is adjustable longitudinally relative thereto.

An upstanding handle 10 is connected to the bar 6 intermediate its ends.

In operation, the clamp 1 binds the flesh and muscles comprising the flanks of the cow 2, and extends across the hollow above the hips, forming an effective barrier capable of positively preventing the cow from kicking.

The invention may be modified in various ways without departing from the spirit and scope thereof.

What is claimed is:

A clamp conformable to the back and sides of a cow and adapted to be applied thereto, in clamping engagement with the flash and muscles comprising the cow's flanks, and extending across the hollow above the hips, to prevent the cow from kicking, comprising a pair of elongated side members having normally converging lower end portions and normally parallel upper end portions, and having knobs on their opposing sides, adjacent their lower ends, for engagement with the flanks of the cow, an elongated transverse member, arched intermediate its ends for engagement with the back of the cow, pivotally connected at its ends to intermediate portions of the side members, an elongated bar pivotally connected at one end to the upper end of one of the side members, the other of the side members being provided with an opening having a pin extending transversely thereof and secured to the side member, the elongated bar being passed through the opening and having notches therein for selective engagement with the pin, whereby the bar is adjustable longitudinally relative to said other of the side members, to thereby adjust the inclination of the side members relative to each other, said other of the side members being longer than said one of the side members and having an upper end portion extending above the opening therein for use as a handle, and an upstanding handle connected to the bar intermediate its ends.

References Cited in the file of this patent

UNITED STATES PATENTS

| | | |
|---|---|---|
| 546,999 | Cunningham | Oct. 1, 1895 |
| 1,047,104 | Moss | Dec. 10, 1912 |
| 2,762,334 | Allen | Sept. 11, 1956 |
| 2,796,849 | Anderson et al. | June 25, 1957 |